US006644466B2

(12) United States Patent
Knott et al.

(10) Patent No.: US 6,644,466 B2
(45) Date of Patent: Nov. 11, 2003

(54) PLATFORM-TOP RADIUS BELT AND MODULES

(75) Inventors: Errol P Knott, Gonzales, LA (US); Christopher J Verdigets, Ponchatoula, LA (US); R. Scott Dailey, Destrehan, LA (US)

(73) Assignee: The Laitram Corporation, Harahan, LA (US)

( * ) Notice: Subject to any disclaimer, the term of this patent is extended or adjusted under 35 U.S.C. 154(b) by 52 days.

(21) Appl. No.: 10/066,038

(22) Filed: Jan. 31, 2002

(65) Prior Publication Data

US 2003/0136647 A1 Jul. 24, 2003

(51) Int. Cl.[7] .............................................. B56B 17/06
(52) U.S. Cl. ...................................... 198/850; 198/853
(58) Field of Search ................................ 198/831, 850, 198/851, 852, 853

(56) References Cited

U.S. PATENT DOCUMENTS 3,333,678 A 8/1967 Rodman
3,595,380 A * 7/1971 Miller .................... 198/850 X
3,788,455 A 1/1974 Dieckmann, Jr.
3,807,548 A * 4/1974 Bergeron .................... 198/850
4,153,152 A 5/1979 Lapeyre
4,688,670 A 8/1987 Lapeyre ...................... 198/853
4,742,907 A 5/1988 Palmaer
4,754,872 A 7/1988 Damkjaer
5,027,944 A 7/1991 Damkjaer
5,307,923 A * 5/1994 Damkjaer ............... 198/853 X
5,372,248 A 12/1994 Horton
5,404,997 A 4/1995 Schreier et al.
5,797,820 A 8/1998 Endo .......................... 474/230
5,909,797 A * 6/1999 Van Den Goor ........ 198/853 X
5,921,379 A 7/1999 Horton
6,142,295 A 11/2000 Greve
6,223,889 B1 5/2001 Layne et al. ................ 198/853
6,382,405 B1 5/2002 Palmaer
6,471,048 B1 10/2002 Thompson, Jr. et al. .... 198/853
2001/0050214 A1 12/2001 Guldenfels

FOREIGN PATENT DOCUMENTS

NL 7502105 2/1975

OTHER PUBLICATIONS

ISA/EP International Search Report, PCT/US03/02573, completed Apr. 29, 2003 (mailed May 9, 2003).

* cited by examiner

*Primary Examiner*—James R. Bidwell
(74) *Attorney, Agent, or Firm*—James T. Cronvich

(57) ABSTRACT

A platform-top modular radius belt capable of conveying articles along a conveying path that includes straight and curved segments. The belt is constructed of a series of rows of belt modules hingedly interconnected by hinge pins received in aligned apertures formed in interleaved hinge elements of adjacent belt rows. A product support platform is attached to intermediate belt module structure to form a generally continuous article-conveying surface. An overhang forms an extension of the conveying surface and extends over hinge elements along one end of the row to form a gap between the overhang and the hinge elements. An edge portion of the product support platform extends from and is recessed below the level of the conveying surface. The recessed edge of a belt row is received in the gap of an adjacent row below the overlying overhang without interference to allow the inside edge of the modular platform-top belt to collapse at the inside of a turn.

20 Claims, 5 Drawing Sheets

PLATFORM-TOP RADIUS BELT AND MODULES

BACKGROUND

Figure 1:
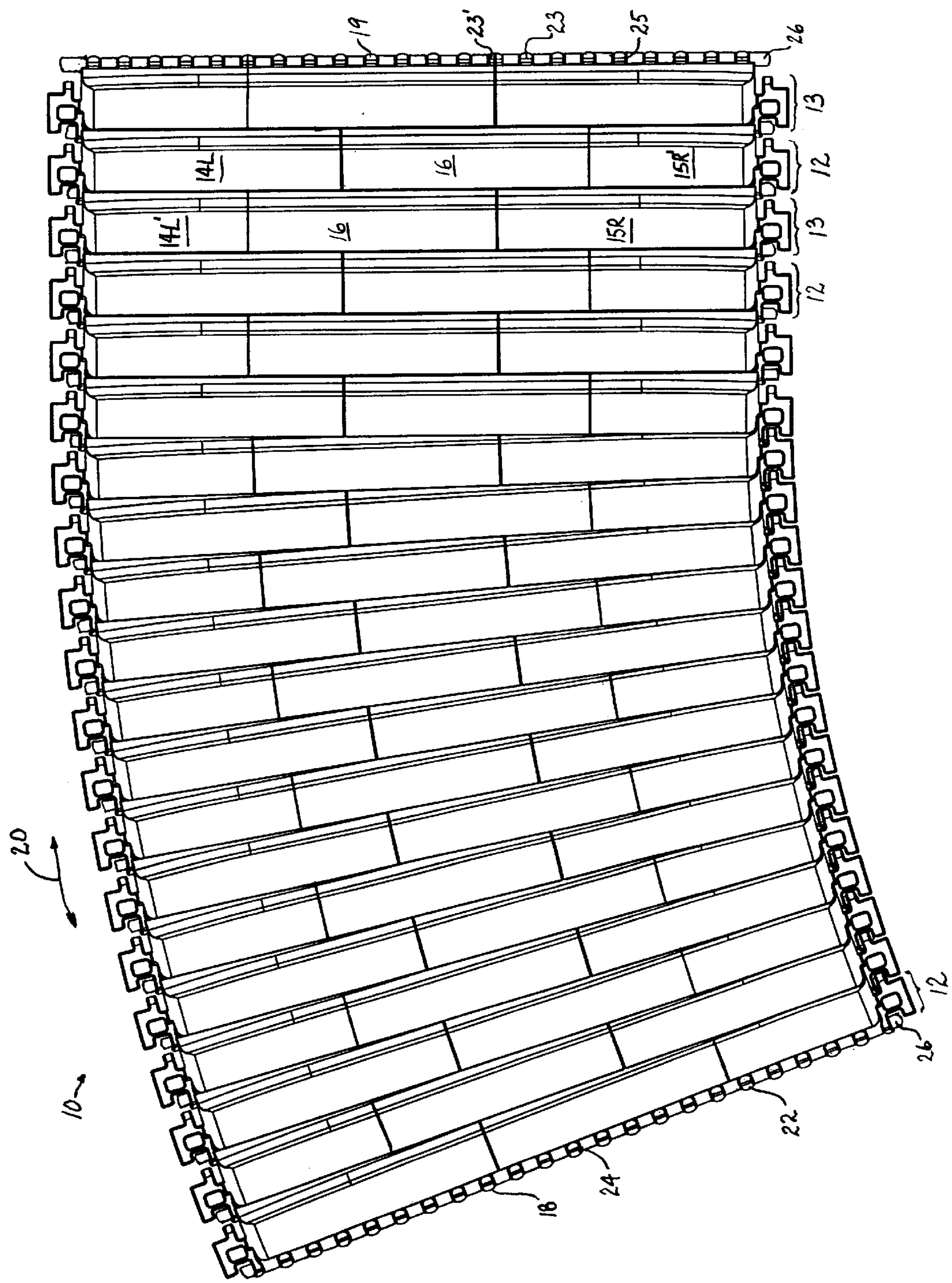

The invention relates to power-driven conveyors generally and, more particularly, to modular conveyor belts with conveying surface platforms and the ability to flex sidewise to negotiate turns.

Because they do not corrode and are easy to clean, plastic conveyor belts are used widely, especially to convey food products. Modular plastic belts are constructed of molded plastic links, or belt modules, arranged in rows. Spaced-apart hinge elements, or link ends, extending from each end of the modules include aligned apertures to accommodate a pivot rod, or hinge pin. The hinge elements along one end of a row of modules are interleaved with the hinge elements of an adjacent row. A hinge pin journaled in the aligned apertures of the end-to-end rows, connects adjacent rows together to form an endless modular conveyor belt capable of articulating about a drive sprocket.

In many industrial applications, conveyor belts are used to carry products along paths including curved, as well as straight, segments. Belts capable of flexing sidewise to follow paths are referred to as side-flexing, turn, or radius belts. As a radius belt negotiates a turn, the edge of the belt at the outside of the turn follows a longer path than the edge at the inside of the turn. To enable the belt to negotiate the turn, the apertures in the hinge elements along at least one end of a row of modules are typically elongated in the direction of belt travel. The elongated apertures allow the belt to collapse at the inside of a turn. The spaces between adjacent hinge elements in radius belts are deep to accommodate the interleaved hinge elements of the adjacent row at the inside of a turn.

Because a belt under tension must collapse at the inside of a turn, radius belts are designed without structural features that would interfere with the collapsing of adjacent belt rows. For this reason, radius belts are typically open-area belts. Flat-top belts, which are characterized by a continuous, largely closed conveying surface, are typically straight-running belts only.

Thus, there is a need for a modular conveyor belt capable of following a curved path and providing a conveying surface that is largely continuous and closed.

SUMMARY

This need and others are provided by a platform-top radius belt embodying features of the invention. Such a belt, in one version, is constructed of a series of rows of belt modules. Each row includes at least one belt module that extends from a first end to a second end in the direction of belt travel. A first plurality of hinge elements is disposed along the first end, and a second plurality along the second end. First aligned apertures are formed in the first plurality of hinge elements, and second aligned apertures are formed in the second plurality of hinge elements. Apertures through the first or second pluralities of hinge elements are elongated in the direction of belt travel. The first and second pluralities of hinge elements extend from intermediate structure of the belt modules. A product support platform is attached to the intermediate structure. The platform has a conveying surface. An extension of the conveying surface extends over a portion of the first plurality of hinge elements and forms a gap that separates the overhanging extension and the hinge elements. An edge portion extends from the product support platform opposite the overhanging extension. The edge portion is recessed below the level of the conveying surface. The first plurality of hinge elements along each row is interleaved with the second plurality of hinge elements of an adjacent row. The aligned apertures of the interleaved hinge elements form passageways between adjacent rows that receive hinge pins to pivotably connect adjacent rows together into a conveyor belt.

In another version of the belt, a product support platform has a generally continuous conveying surface that is elevated above upper surfaces of the first and second pluralities of hinge elements. A gap separates the product support platform and the upper surfaces of the first plurality of hinge elements.

In yet another version, a product support platform has a first edge overlying the first plurality of hinge elements and an opposite recessed second edge that extends onto the second plurality of hinge elements. The second edge is contoured to receive the first edge of an adjacent row.

In still another version, the conveying surface is generally rectangular. In another version, the first and second edges of the product support platform each follow a nonlinear edge pattern.

One version of a conveyor belt module embodying features of the invention includes a first plurality of hinge elements and a second plurality of hinge elements extending from intermediate structure toward opposite first and second ends of the module. A product support platform, attached to the intermediate structure, has a conveying surface that is elevated relative to the hinge elements. An overhang extends from the conveying surface above the first plurality of hinge elements across a gap.

In another version of a conveyor belt module, the conveying surface is generally rectangular. In still another version, the product support platform includes opposite first and second edges in a nonlinear edge pattern.

Thus, the invention provides a modular conveyor belt and modules for its construction that provide a conveying platform in a radius belt that can operate on straight and curved conveying paths.

DRAWINGS

Figure 3B:
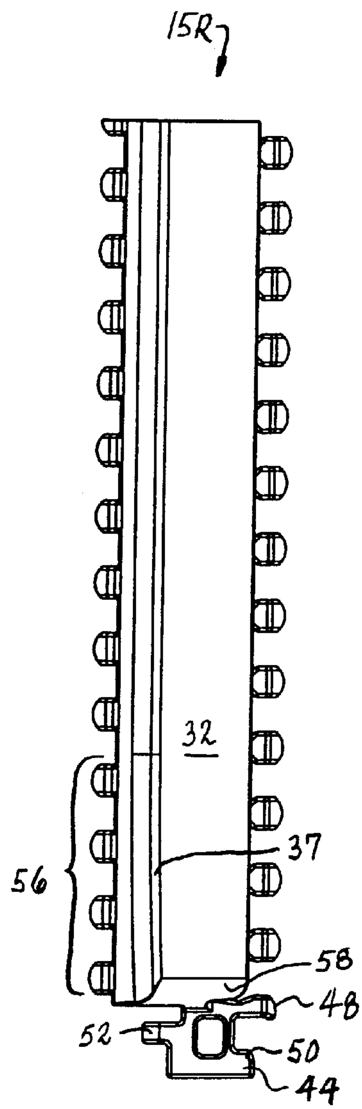
Figure 3A:
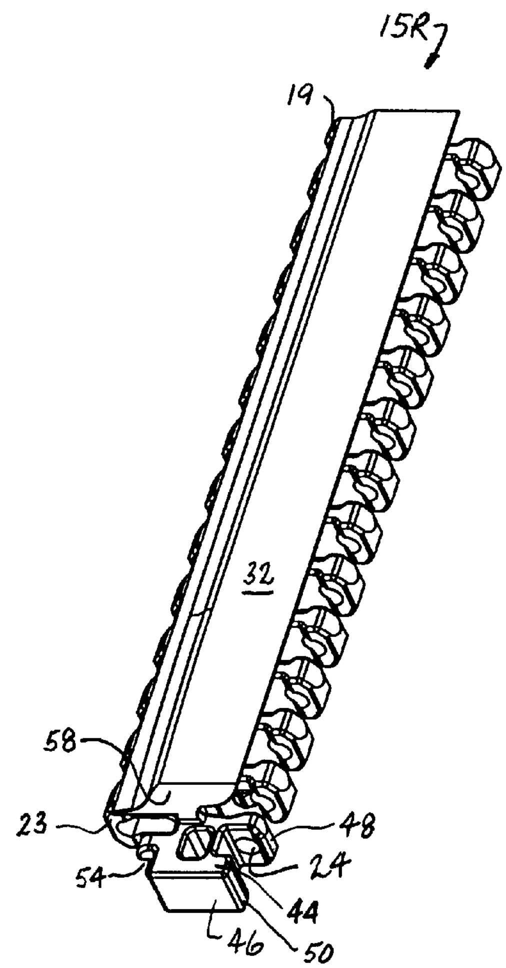
Figure 3C:
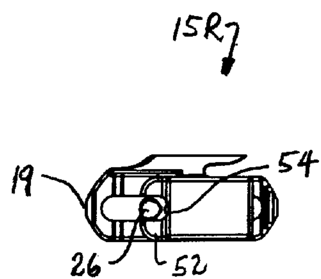
Figure 4:
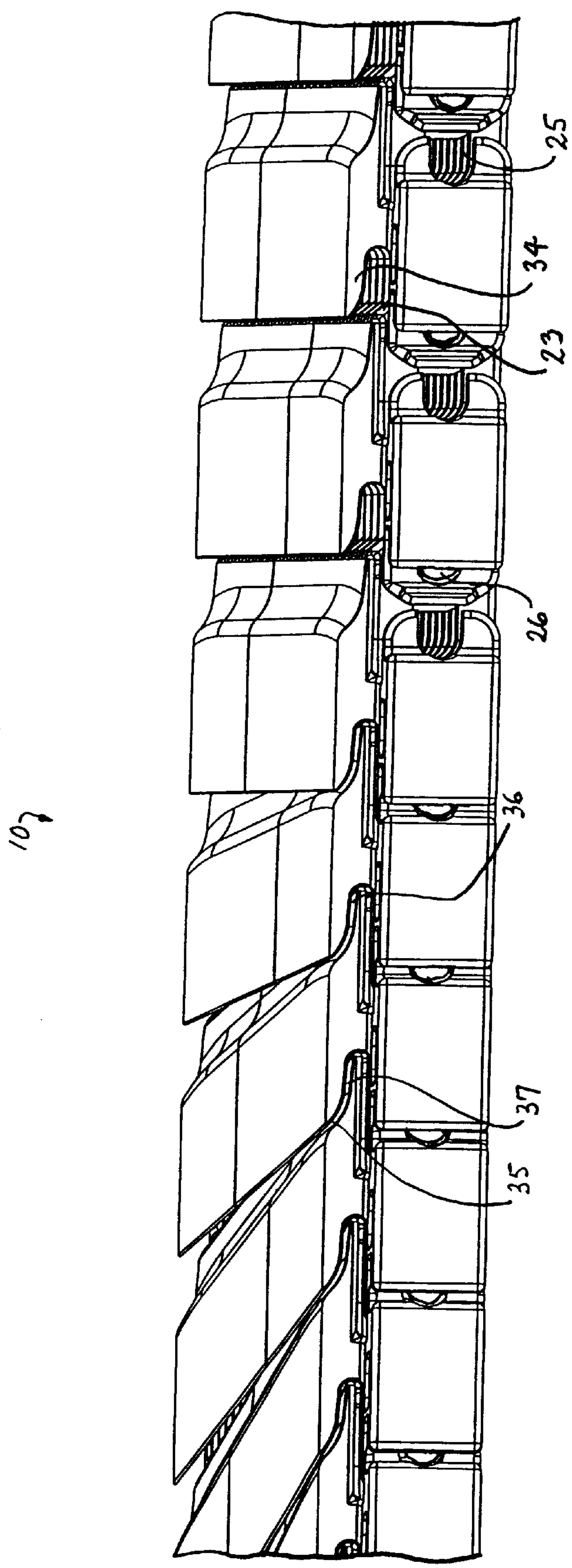
Figure 5:
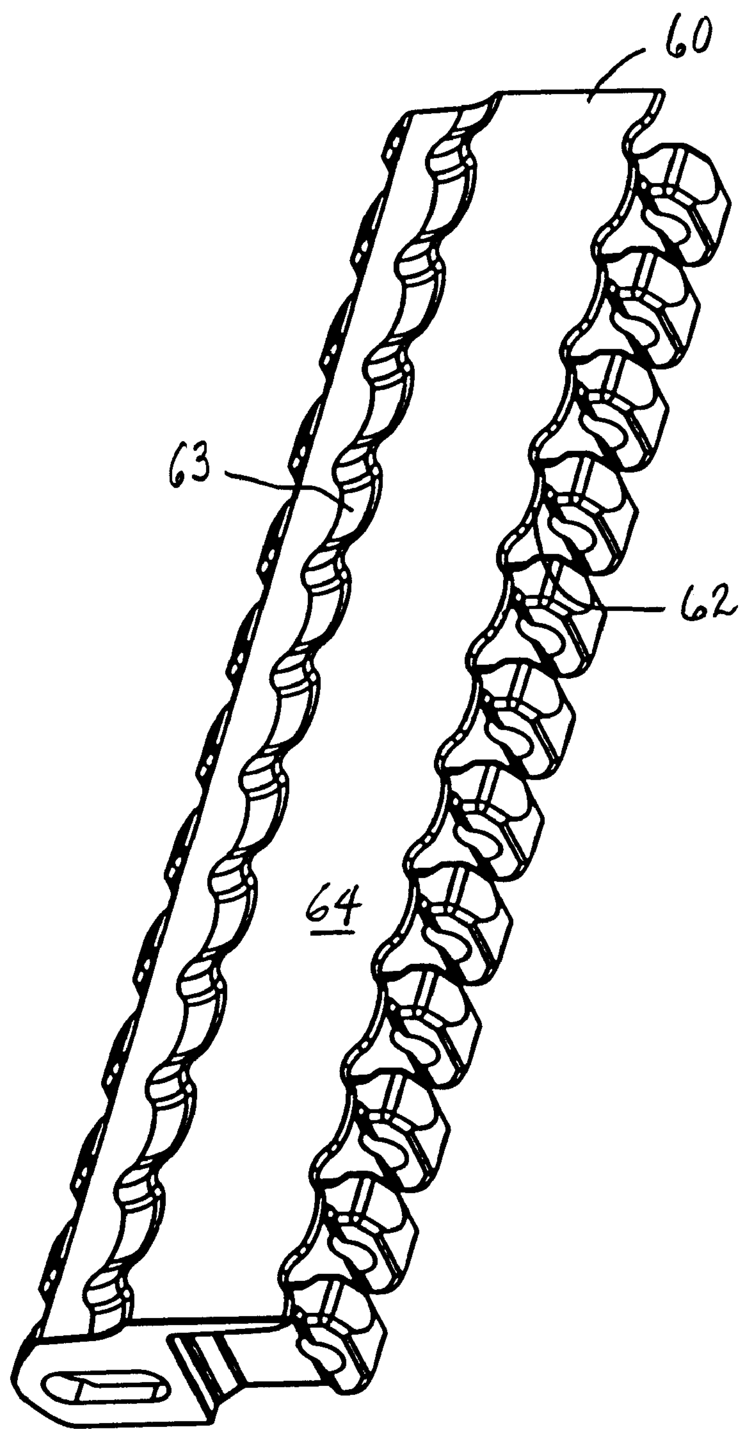

These and other features, aspects, and advantages of the invention are better understood by reference to the following description, appended claims, and accompanying drawings, in which:

FIG. 1 is a top view of a portion of a conveyor belt embodying features of the invention;

FIGS. 2A, 2B, 2C, and 2D are top isometric, top plan, side elevation, and bottom isometric views of an interior module usable in the conveyor belt of FIG. 1;

FIGS. 3A, 3B, and 3C are top isometric, top plan, and side elevation views of an edge module usable in the conveyor belt of FIG. 1;

FIG. 4 is a side pictorial of the belt section of FIG. 1 showing the performance of the belt on straight and curved conveying paths; and FIG. 5 is a top isometric view of another version of an interior module usable in a conveyor belt as in FIG. 1.

DETAILED DESCRIPTION

An exemplary version of a portion of a conveyor belt embodying features of the invention is shown in FIG. 1. The belt 10 is constructed of a series of rows 12, 13 of belt modules arranged, in this example, in a bricklay pattern. Every other row is identical. Row 12 comprises a long left-side edge module 14L, a short right-side edge module 15R', and an interior module 16. The modules are arranged side by side to form the row 12. Adjacent row 13 comprises a short left-side edge module 14L', a long right-side edge module 15R, and an interior module 16 similarly arranged side by side. The width of the belt can be increased by adding more internal modules to each row or by using wider modules. Although FIG. 1 shows more than one module in each row, one could form a row out of a single module as well.

Each module 14, 15, 16 extends from a first end 18 to a second end 19 in the direction of belt travel indicated by two-headed arrow 20, which indicates the belt may operate in forward and reverse directions. Preferably, however, the belt 10 is driven toward the right in FIG. 1. A first plurality of hinge elements 22 is formed along the first end of the modules of a row; and a second plurality of hinge elements 23, along the second end. Apertures 24, 25 are formed in the first and second hinge elements. The hinge elements 22 at the first end of a row interleave with the hinge elements 23 at the second end of an adjacent row. The apertures of the interleaved hinge elements are aligned to form a lateral passageway through the interleaved hinge elements. The passageway receives a hinge pin 26 that connects the rows together into a hinged belt capable of articulating about a drive sprocket or drum.

Further details of internal and edge belt modules are depicted in FIGS. 2 and 3. FIGS. 2A–2D show an exemplary interior module 16. The module extends from a first end 18 to a second end 19. Hinge elements 22, 23 are arranged along the first and second ends. Outermost hinge elements 23' along the second end are half elements in this version of the modules to simplify bricklayed belt construction. Apertures 24 formed in the hinge elements 22 along the first end are generally circular in cross section. Apertures 25 formed in the hinge elements 23 along the second end are elongated. This elongation of at least one set of apertures permits a belt constructed of these modules to collapse at the inside of a turn as shown in FIG. 1.

The hinge elements extend in opposite directions from intermediate structure 28 of the modules. A product support platform 30 attached (integrally, in this example) to the intermediate structure includes a top conveying surface 32. The product support platform shown is generally rectangular in shape and defines a generally continuous conveying surface for conveyed articles. (The conveying surface can be completely closed, as shown in the drawings, or perforated for drainage or air flow.) An overhang 34 extends out along a first edge 35 of the product support platform to form an extension of the conveying surface. The extension extends over a portion of the first plurality of hinge elements 22. A gap 36 separates the tops of the hinge elements from the overhang. Also extending from the product support platform along a second edge 37 opposite the overhang is an edge portion 38 that is recessed below the level of the conveying surface as indicated by dimension D in FIG. 2C. The recessed edge is contoured along a tapered surface 40 in transition from the conveying surface to an upper surface 43 of the hinge elements 23. The tapered surface shown in this version is concave, but any tapered surface, such as an angled surface, that accommodates the shape of the overhang of an adjacent row can be used. As clearly shown in FIG. 2C, the upper surfaces 42 of the first plurality of hinge elements 22 lie in a plane below the plane defined by the upper surfaces 43 of the second plurality of hinge elements 23. Thus, the upper surfaces of the two pluralities of hinge elements are not coplanar. The distal first edge 35 of the overhang 34 is tapered to mate with the tapered second recessed edge 37 of a similar module in an adjacent row in a vertically overlapping relationship when the belt is in a collapsed state.

Figure 2A:
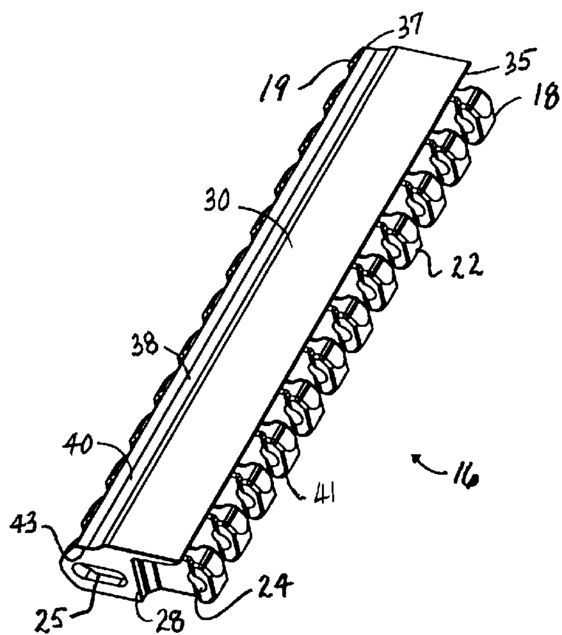
Figure 2D:
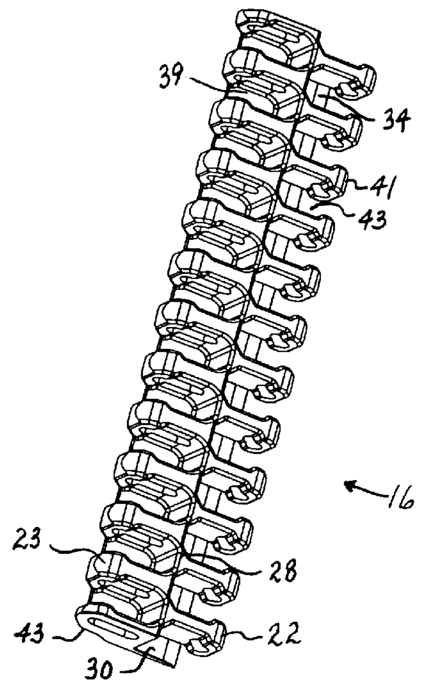
Figure 2B:
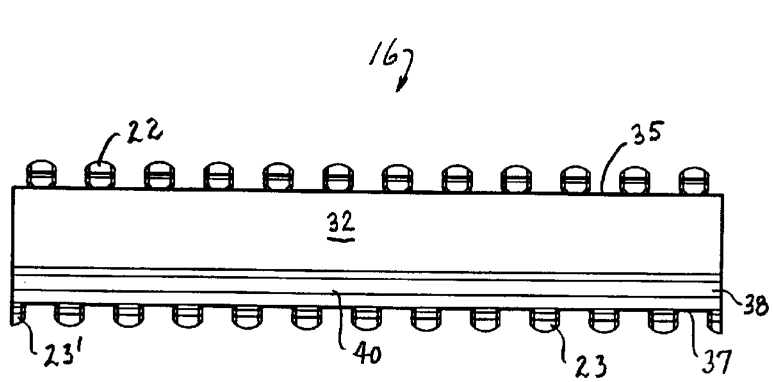
Figure 2C:
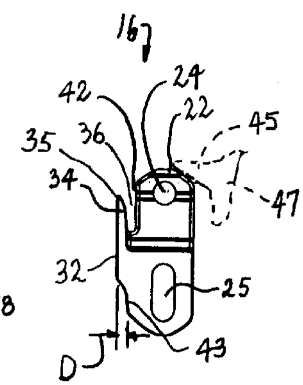

As shown in FIG. 2D, the module provides a chamfered bottom edge 41 on the hinge elements. Spaces 39 between consecutive hinge elements are deep enough to admit the tooth 45 of a drive or idler sprocket 47. The tooth pushes against the chamfered edge of the hinge element to drive a belt constructed of such modules. Of course, other drive structures that are compatible with other sprocket tooth arrangements could be used with the article-conveying features of the invention.

A belt edge module, exemplified by a right-side edge module 15R, is shown in FIGS. 3A–3C. In most respects, the edge module is the same as the interior module 16. One difference is that the edge module includes a side piece 44 on one side of the module beyond the lateral extent of the product support platform. The side piece forms an outside edge—either the inner side or the outer side, depending on the direction of the turn—of a belt row. The side piece is characterized by a flush side edge 46 that presents a flat bearing surface to a conveyor side rail. The edge piece also includes a narrow hinge element 48 with an aperture 24 for a hinge pin. The flush side edge includes a projecting portion 50 that occludes a portion of the passageway formed by the aligned apertures 24 along the first end of the module. Thus, the projecting portion permits the insertion of a flexible hinge pin into the apertures, but prevents the hinge pin from working its way out of its passageway while the belt is running. A protrusion 52 extending from the side piece toward the second end of the edge module serves to support the end of the hinge rod in an assembled belt. The protrusion fits between the projecting portion 50 and the narrow hinge element 48 of an adjacent module. A notch 54 in the protrusion matches a portion of the elongated apertures, or slots, in the hinge elements 23 along the second end 19 of the edge module. The end of the hinge rod received in the notch is confined against up and down motion by the structure of the side piece defining the notch.

Another difference between the example side-edge module 1 SR and the example interior module 16 is the product support platform. Unlike the platform shown in FIG. 2, the platform in FIG. 3 is narrowest at the side of the module nearer the side piece. Thus, the platform of an edge module, although generally rectangular, deviates slightly from perfectly rectangular. The second edge 37 of the product support platform at the outside of the module flares inwardly with proximity to the side. This flaring of the second edge in an outer region 56 of the edge module decreases the flat conveying surface 32 in this region and allows a belt made with these modules to collapse even more at the inside of a turn. Of course, belt modules without this feature are also within the scope of the invention. The outside edge 58 of the platform is preferably rounded.

The modules described are preferably made by injection molding a thermoplastic material such as acetal, polyethylene, polypropylene, composite or other materials. Thermoplastic belt modules manufactured in this way are sold by many manufacturers. Intralox, Inc. of Harahan, La., USA, for instance, manufacturers and sells an extensive line of modular plastic belt modules for a variety of applications. Its Series 2400 belt modules share some of the features of the exemplary modules described in the preferred embodiment of this invention. The connecting hinge pins are typically made of polypropylene, polyethylene, acetal, nylon, or composite materials by extrusion or molding. One skilled in the art will recognize that the modules could be made other than by injection-molding thermoplastic materials. Metal modules or machined plastic modules with the same features as those described are also within the scope of the invention. Similarly, metal hinge pins could likewise be used to construct belts according to the invention.

A side pictorial of a section of belt as in FIG. 1 is shown in FIG. 4 to depict the performance of the belt on straight and curved conveying paths. The belt rows on the right in FIG. 4 are shown on a straight conveying path. As the belt 10 runs along a straight path, the belt rows are pulled apart into an extended condition by belt tension. The hinge pins 26, in this condition, reside in the distal ends of the elongated apertures 25 in the hinge elements along the second ends of the row. The overhang 34 is sufficiently long to overlie the distal ends of the second hinge elements 23 of the adjacent row, even though the rows are in an extended state. In a turn, however, the insides of the belt rows collapse together, while the outsides remain extended. Along the collapsed inside edge of the belt, as shown in the left in FIG. 4, the recessed edge 37 receives the first edge 35 of an adjacent row. The recessed edge is contoured to mate with the first edge in the collapsed state. The recessed edge fits into the gap 36 to allow the belt to collapse.

Another version of belt module that can be used is exemplified by the internal module 60 depicted in FIG. 5. In this version, the first and second edges 62, 63 of the product support platform 64 define a nonlinear edge pattern. The nonlinear edges are complementary to enable the first edge of one belt row to mate with the second edge of an adjacent belt row. One advantage of this nonlinear pattern is that it replaces the linear break between the conveying surfaces of adjacent belt rows with a nonlinear break that is less likely to trip articles transferring from row to row. Although the edge pattern shown is somewhat sinusoidal in shape, other nonlinear patterns, such as triangular, sawtooth, and square, could be used.

Thus, the invention provides a modular radius conveyor belt with a platform conveying surface for transporting for transporting articles along conveying paths that may include both straight and curved segments.

Although the invention has been described in detail with reference to a preferred version, other versions are possible. For example, the underside construction and drive structure could be other than that shown. Likewise, the intermediate structure could be different. As another example, the platform could be a separable piece from the rest of the module that could be replaced as it wears or is damaged. So, as these few examples suggest, the spirit and scope of the claims are not limited to the preferred embodiment.

What is claimed is:

1. A modular conveyor belt suitable for following curved paths, the conveyor belt comprising:

a series of rows of belt modules, each row including:

at least one belt module extending from a first end to a second end in the direction of belt travel and including:

a first plurality of hinge elements disposed along the first end and forming first aligned apertures therethrough;

a second plurality of hinge elements disposed along the second end and forming second aligned apertures therethrough;

wherein apertures through at least one of the first and second pluralities of hinge elements are elongated in the direction of belt travel;

intermediate structure from which the first and second pluralities of hinge elements extend in opposite directions; and a product support platform attached to the intermediate structure, the product support platform including:

a conveying surface;

an overhang forming an extension of the conveying surface and extending over at least a portion of the first plurality of hinge elements and forming a gap separating the overhang from the first plurality of hinge elements;

an edge portion extending from the conveying surface opposite the overhang toward die second end and recessed below the level of the conveying surface;

a plurality of binge pins;

wherein the first plurality of binge elements of each row are interleaved with the second plurality of hinge elements of an adjacent row with the apertures aligned to form passageways between adjacent rows for receiving binge pins that pivotably connect adjacent rows into a conveyor belt.

2. A modular conveyor belt as in claim 1 wherein the edge portion forms a concave surface.

3. A modular conveyor belt as in claim 1 wherein the overhang of a row extends over the edge portion of an adjacent row at the side of the conveyor belt at the inside of a turn.

4. A modular conveyor belt as in claim 1 wherein apertures through the second plurality of hinge elements are elongated in the direction of belt travel.

5. A modular conveyor belt as in claim 1 wherein the product support platform forms a generally continuous conveying surface.

6. A modular conveyor belt as in claim 1 wherein the product support platform forms a generally rectangular conveying surface.

7. A modular conveyor belt as in claim 1 wherein the product support platform includes opposite first and second edges in a nonlinear edge pattern.

8. A modular conveyor belt as in claim 1 wherein the edge portion defines a contour descending from the conveying surface to an upper surface of the second plurality of hinge elements.

9. A modular conveyor belt as in claim 1 wherein upper surfaces of the first plurality of hinge elements are noncoplanar with upper surfaces of the second plurality of hinge elements.

10. A modular conveyor belt as in claim 1 wherein the overhang extends over the distal end of the outermost hinge element of the second plurality of hinge elements of an adjacent row at the outside of a turn.

11. A modular conveyor belt suitable for following curved paths, the conveyor belt comprising:

a series of rows of belt modules, each row including:

at least one belt module extending from a first end to a second end in the direction of belt travel and including:

a first plurality of hinge elements disposed along the first end and forming first aligned apertures therethrough and having an upper surface;

a second plurality of binge elements disposed along the second end and forming second aligned apertures therethrough and having an upper surface;

wherein apertures through at least one of the first and second pluralities of hinge elements are elongated in the direction of belt travel;

intermediate structure from which the first and second pluralities of hinge elements extend in opposite directions; and a product support platform attached to the intermediate structure and defining a generally continuous conveying surface elevated relative to the upper surfaces of the first and second pluralities of binge elements with a gap formed between the product support platform and the upper surfaces of the first plurality of binge elements;

a plurality of binge pins;

wherein the first plurality of hinge elements of each row are interleaved with the second plurality of hinge elements of an adjacent row wit the apertures aligned to form passageways between adjacent rows for receiving hinge pins that pivotably connect adjacent rows into a conveyor belt.

12. A modular conveyor belt as in claim 11 wherein the product support platform includes a recessed edge extending from the conveying surface downward to the upper surfaces of the second plurality of hinge elements and wherein the recessed edge along one row is received in the gap of an adjacent row to allow the conveyor belt to collapse at the inside of a turn without interference between the product support platforms of adjacent rows.

13. A modular conveyor belt as in claim 11 wherein the product support platform includes a tapered edge extending from the conveying surface downward to the upper surfaces of the second plurality of hinge elements and an extension of the conveying surface extending over the first plurality of hinge elements and including a distal edge tapered to mate with the tapered edge of an adjacent row in overlapping relationship in a collapsed condition of the conveyor belt.

14. A modular conveyor belt as in claim 11 wherein upper surfaces of the first plurality of hinge elements are non-coplanar wit upper surfaces of the second plurality of binge elements.

15. A nodular conveyor belt suitable for following curved paths, the conveyor belt comprising:

a series of rows of belt modules, each row including:

at least one belt module extending from a first end to a second end in the direction of belt travel and including:

a first plurality of hinge elements disposed along the first end and forming first aligned apertures therethrough;

a second plurality of hinge elements disposed along the second end and forming second aligned apertures therethrough;

wherein apertures through at least one of the first and second pluralities of hinge elements are elongated in the direction of belt travel;

intermediate structure from which the first and second pluralities of binge elements extend in opposite directions; and a product support platform attached to the intermediate structure and including a first edge overlying the first plurality of hinge elements across a gap and an opposite recessed second edge extending onto the second plurality of hinge elements and contoured to receive the first edge of an adjacent row;

a plurality of hinge pins;

wherein the first plurality of hinge elements of each row are interleaved with the second plurality of hinge elements of an adjacent row wit the apertures aligned to form passageways between adjacent rows for receiving hinge pins tat pivotably connect adjacent rows into a conveyor belt.

16. A conveyor belt module comprising:

a first plurality of hinge elements forming aligned apertures defining a lateral passageway trough the first plurality of hinge elements;

a second plurality of hinge elements forming aligned apertures defining a lateral passageway through the second plurality of hinge elements;

intermediate structure from which the first plurality of hinge elements extends toward a first end of the module and from which a second plurality of hinge elements extends toward an opposite second end of the module;

a product support platform attached to the intermediate structure, the product support platform including:

a conveying surface elevated relative to the hinge elements and having an overhang extending the conveying surface above the first plurality of hinge elements across a gap.

17. A conveyor belt module as in claim 16 wherein the product support platform is supported on the second plurality of hinge elements and on the intermediate structure.

18. A conveyor belt module as in claim 16 wherein the product support platform forms a generally rectangular conveying surface.

19. A conveyor belt module as in claim 16 wherein the product support platform includes opposite first and second edges in a nonlinear edge pattern.

20. A conveyor belt module as in claim 16 wherein the product support platform includes a recessed edge opposite the overhang across the conveying surface.

* * * * *